United States Patent [19]

Hobbs

[11] Patent Number: 4,493,185

[45] Date of Patent: Jan. 15, 1985

[54] GAS TURBINE ENGINE AIR INTAKE

[75] Inventor: John R. Hobbs, Amersham, England

[73] Assignee: Rolls-Royce Limited, London, England

[21] Appl. No.: 478,787

[22] Filed: Mar. 25, 1983

Related U.S. Application Data

[63] Continuation-in-part of Ser. No. 225,110, Jan. 14, 1981, abandoned.

[30] Foreign Application Priority Data

Feb. 9, 1980 [GB] United Kingdom ................ 8004401

[51] Int. Cl.$^3$ ............................................. F04D 29/70
[52] U.S. Cl. .................................... 60/39.092; 55/306
[58] Field of Search ........................ 60/39.092, 39.091;
137/15.1, 15.2; 55/306, 394, 468; 244/53 B;
417/167

[56] References Cited

U.S. PATENT DOCUMENTS

| | | | |
|---|---|---|---|
| 2,000,741 | 5/1935 | Buckland | 417/167 |
| 3,148,043 | 9/1964 | Richardson et al. | 60/39.092 |
| 3,338,049 | 8/1967 | Fernberger | 60/39.092 |
| 3,368,332 | 2/1968 | Hooper et al. | 55/306 |
| 3,513,641 | 5/1970 | Hooper et al. | 55/306 |
| 3,616,616 | 11/1971 | Flatt | 55/306 |
| 3,684,857 | 8/1972 | Morley et al. | 60/39.092 |
| 3,977,811 | 8/1976 | Kuintzle, Jr. | 137/15.1 |

Primary Examiner—Louis J. Casaregola
Assistant Examiner—Jeffrey A. Simenauer
Attorney, Agent, or Firm—Cushman, Darby & Cushman

[57] ABSTRACT

A gas turbine engine air intake comprises an enlarged center body positioned upstream of the engine air inlet. The center body is provided with a drain so that in operation water particles impacting and flowing across the surface of the center body are directed into the interior of the center body. From there the water is drained into a by-pass duct which exhausts the water into the exhaust efflux of the engine to which the intake is attached.

6 Claims, 2 Drawing Figures

GAS TURBINE ENGINE AIR INTAKE

This application is a continuation-in-part of my United States application Ser. No. 225,110, filed Jan. 14, 1981, now abandoned.

This invention relates to gas turbine engine air intakes.

Gas turbine engines for use in powering helicopters may be provided with air intakes which are adapted to separate particulate material from the air which eventually enters the engine. One common form of air intake which achieves this end comprises a duct defining the engine air inlet and a centre body positioned upstream of the duct. The centre body has a convex, dome-shaped upstream facing face which is of larger diameter than the engine air inlet. Thus air which eventually enters the engine air inlet must first follow a sinuous path around the centre body. The momentum of any particulate material carried by the air ensures that instead of following the same sinuous path as the air, it tends to be thrown clear of the engine air inlet.

If the air drawn in by the engine additionally carries water droplets, some will be thrown clear of the engine air inlet in the same way as the particulate material. However, the remainder impact the centre body and break up into a large number of smaller droplets which, as a result of surface tension forces, tend to adhere to the centre body and eventually flow into the engine air inlet. This is a highly undesirable phenomenon if the droplets are of sea water since their presence in the engine invariably results in accelerated rates of engine component corrosion.

U.S. Pat. No. 3,148,043 of Richardson et al describes a gas turbine engine air intake which is generally of this type. However its centre body is hollow and defined by two portions which are spaced apart so that they define an annular gap. The gap is so positioned that any water droplets flowing over the outer surface of the centre body pass through the gap and into the centre body interior. Thus the water droplets are prevented from flowing into the engine air inlet. There are, however, certain drawbacks with the air intake of Richardson et al. Firstly the water droplets which pass into the centre body interior have to be ducted or drawn off to a suitable container. Secondly, in order to ensure that the water droplets flow into the centre body interior, a step is defined between the two portions of the centre body so that the annular gap through which the water droplets flow is essentially radially extending. Unfortunately this step gives rise to turbulence and consequently has a detrimental effect upon the aerodynamics of the centre body.

It is an object of the present invention therefore to provide a gas turbine engine air intake which substantially avoids such drawbacks.

According to the present invention, a gas turbine engine intake comprises:

a duct having a circular cross-section shape;

a centre body having a hollow interior and having a circular cross-section shape, said centre body having a first portion coaxially positioned upstream of said duct, said first portion having a part thereof of a greater diameter than said duct, said centre body further having a second portion extending coaxially within said duct and defining therewith an annular air inlet;

a first drain means positioned on said first portion of said centre body and providing communication between the exterior and the hollow interior of said centre body;

said drain means being defined by the confronting edges of aligned portions of said centre body so that said drain means provides the only interruption of the otherwise continuous exterior of said centre body, and being positioned to direct at least some of any liquid droplets impacting and subsequently flowing across the exterior of said first portion of said centre body into the hollow interior of said centre body;

means to reduce the air pressure within the hollow interior of said centre body whereby the flow of liquid droplets through said drain means is enhanced; and a second drain means operatively associated with said centre body for draining liquid from the hollow interior of said centre body to a location remote from said engine air inlet.

The invention will now be described, by way of example, with reference to the accompanying drawings in which.

Figure 1:
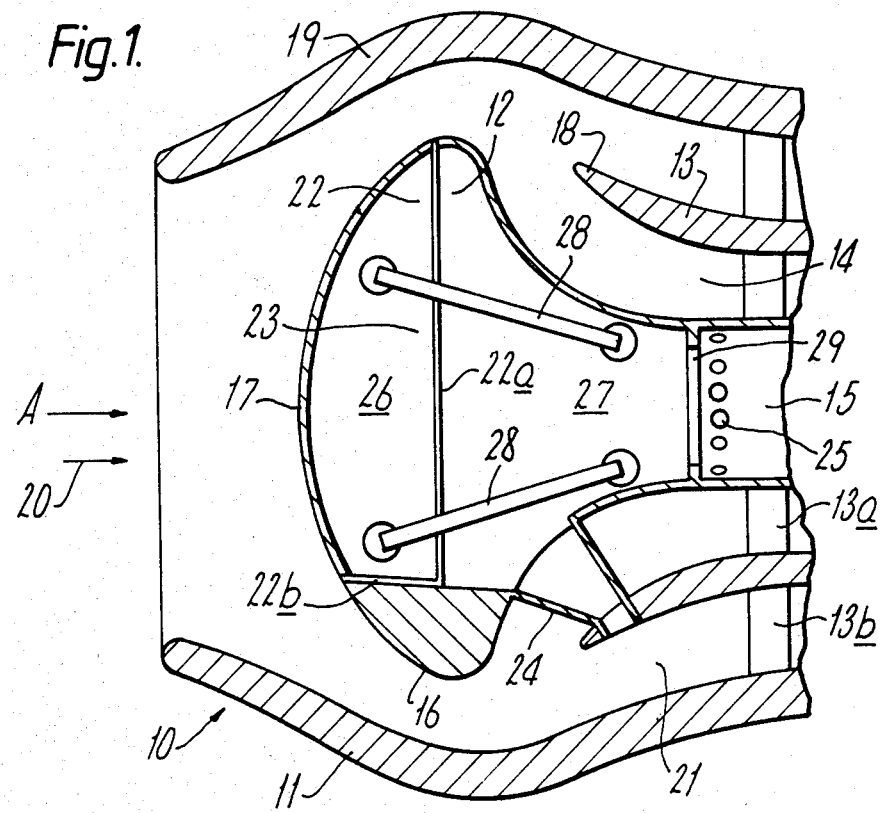
FIG. 1 is a sectioned side view of a gas turbine engine air intake in accordance with the present invention.
Figure 2:
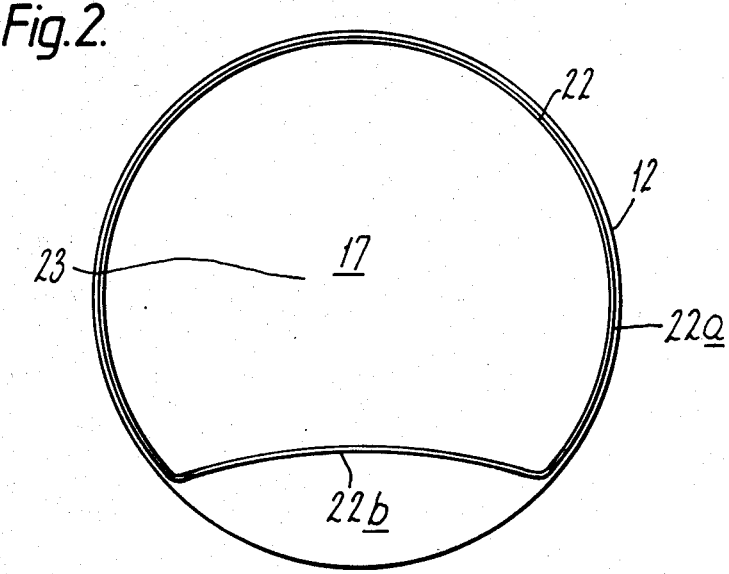
FIG. 2 is a view on arrow A of the centre body of the gas turbine engine air intake shown in FIG. 1.

With reference to FIg. 1, a gas turbine engine air intake generally indicated at 10 consists of an outer cowling 11 enclosing a centre body 12 having a hollow interior and a duct 13 which defines the engine air inlet 14. The cowling 11, centre body 12 and duct 13 are all of circular cross-sectional shape.

A portion 15 of the centre body 12 is located within the duct 13 so that the air intake 14 is annular in form. It is supported from the hollow duct 13 by a plurality of struts 13a and the duct 13 in turn supports the cowling 11 by means of a plurality further struts 13b. The diameter of the hollow centre body 12 progressively increases as it emerges from the duct 13 in the direction right to left (when viewed in FIG. 1) until it reaches a maximum value at 16 where its diameter is greater than that of the duct 13. Its diameter then progressively decreases to define a generally convex, dome- shaped face 17. The lip 18 of the duct 13 is outwardly flared to accommodate the diverging shape of the centre body 12.

The cowling 11 is provided with an enlarged diameter region 19 to accommodate the maximum diameter part 16 of the centre body 12. Thus in operation, air entering the cowling 11 in the direction indicated by the arrow 20 must first follow a sinuous path around the centre body 12 before entering the engine air inlet 14. As the air passes the largest diameter part 16 of the centre body 12, it flows radially inwards as it is drawn into the engine air inlet 14. The momentum of any particulate material carried by the air tends to cause those particles to deviate from the air flow path and follow a trajectory which avoids the engine air inlet 14. The trajectory of the particulate material in fact carries it into a by-pass duct 21 which is defined between the cowling 11 and the duct 13. The by-pass duct 21 extends the length of the gas turbine engine (not shown) before exhausting into the engine exhaust efflux. Thus any particulate material carried by the air entering the cowling 11 is separated from that air flow and subsequently passed into the engine exhaust efflux.

If the air entering the cowling 11 carries water droplets, then some of those droplets will impact the face 17 of the centre body 12 and break up into a large number of smaller droplets. As a result of surface tension forces those smaller droplets tend to adhere to the face 17 and flow towards the greatest diameter diameter part 16 of the centre body 12. However, immediately upstream of the greatest diameter part 16 of the centre body 12 they encounter a drain 22 the major portion 22a of which extends generally circumferentially around the upper region of the center body 12 whilst the remaining portion 22b interconnects the extents of the major portion 22a. The drain 22 directs the water into the interior of the centre body 12. In order to prevent the water from flowing out of the lower regions of the centre body 12 under the influence of gravity, the minor drain portion 22b is not circumferentially extending but instead extends in a generally upwards direction across the lower region of the face 17.

The drain 22 divides the centre body into two protions 26 and 27, the upstream portion 26 being supported from the downstream portion 27 by a plurality of support members, two of which 28 can be seen in FIG. 1. The confronting edges of the portions 26 and 27 are aligned so that the drain 22 provides the only interruption of the otherwise continuous exterior of the centre body 12. This ensures that the aerodynamics of the centre body 12 are disturbed as little as possible by the presence of the drain 22.

From the interior of the centre body 12, the water flows under the influence of gravity through a drainage duct 24 which passes across the annular engine inlet 14 interconnecting the interior of the centre body 12 with the by-pass duct 21. Thus water collected in the interior of the centre body 12 is subsequently drained into the by-pass duct 21 from where it is exhausted into the engine exhaust efflux.

In order to ensure that as much water as possible is directed into the interior of the centre body 12 the air pressure within the centre body 12 is reduced so that the water is sucked through the drain 22. This air pressure reduction is achieved by providing an array of apertures 25 around the portion of the centre body within the duct 13. Thus the air flow in operation through the annular engine air inlet 14 induces a secondary air flow from the interior of the centre body 12 through the apertures 25.

In order to ensure that water which has been sucked through the drain 22 and into the centre body 12 interior is not subsequently drawn into the engine inlet 14 thorugh the apertures 25, an annular fence 29 is provided on the internal surface of the centre body 12 upstream of the apertures 25. The fence 29 provides a barrier to any water droplets which may flow over the internal surface of the centre body 12.

We claim:

1. A gas turbine engine air intake comprising:
    a duct having a circular cross-section shape;
    a centre body having a hollow interior and having a circular cross-section shape, said centre body having a first portion coaxially positioned upstream of said duct, said first portion having a part thereof of greater diameter than said duct, said centre body further having a second portion aligned with said first portion and extending coaxially within said duct and defining therewith an annular air inlet, said first portion and said second portion having spaced confronting edges;
    a first drain means positioned on said first portion of said centre body and providing communication between the exterior and hollow interior of said centre body, said first drain means being defined by said confronting edges of said aligned portions of said centre body so that said first drain means provide the only interruption of the otherwise continuous exterior of said centre body, and being positioned to direct at least some of any liquid droplets impacting and subsequently flowing across the exterior of said first portion of said centre body into the hollow interior of said centre body;
    means to reduce the air pressure within the hollow interior of said centre body whereby the flow of liquid droplets through said drain means is enhanced, said means to reduce the air pressure within said centre body comprising a plurality of apertures in said centre body interconnecting said annular air inlet with the interior of said centre body; and
    a second drain means operatively associated with said centre body for draining liquid from the hollow interior of said centre body to a location remote from said engine air inlet.

2. A gas turbine engine air intake as claimed in claim 1 wherein said first drain means is at least partially circumferentially extending.

3. A gas turbine engine air intake as claimed in claim 2 wherein said first drain means has a major portion extending circumferentially with a remaining portion extending non-circumferentially and interconnecting the extents of said circumferentially extending portion, the circumferentially and non-circumferentially extending drain means portions being so positioned on said centre body that operationally, any liquid passing through said drain means into the interior of said centre body will not flow back through said drain means to the surface of said centre body under the influence of gravity.

4. A gas turbine engine air intake as claimed in claim 1 wherein said duct defining one wall of said engine air inlet is surrounded by a cowling, said duct and said cowling defining an annular engine by-pass duct.

5. A gas turbine engine air intake as claimed in claim 4 wherein said second means for draining said liquid from the hollow interior of said centre body comprises a drainage duct interconnecting the hollow interior of said centre body with said engine by-pass duct, said drainage duct being so positioned that said liquid flows into said engine by-pass duct under the influence of gravity.

6. A gas turbine engine air intake as claimed in claim 4 wherein said cowling additionally surrounds at least said part of greater diameter of said first portion of said centre body such that an annular flow passage is defined between them.

* * * * *